(12) United States Patent
Shah et al.

(10) Patent No.: US 6,270,318 B1
(45) Date of Patent: Aug. 7, 2001

(54) ARTICLE HAVING CORROSION RESISTANT COATING

(75) Inventors: Dilip M. Shah, Glastonbury; Alan David Cetel, West Hartford, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/468,389

(22) Filed: Dec. 20, 1999

(51) Int. Cl.$^7$ ................................ B63H 1/26; F01D 5/14
(52) U.S. Cl. .................................... 416/193 A; 416/241 B
(58) Field of Search ........................ 416/193 A, 241 R, 416/241 B

(56) References Cited

U.S. PATENT DOCUMENTS

| | | | |
|---|---|---|---|
| Re. 32,121 | 4/1986 | Gupta et al. ........................ | 428/656 |
| 2,783,967 | * 3/1957 | Scharf et al. ..................... | 416/241 R |
| 4,209,348 | 6/1980 | Duhl et al. ............................. | 148/3 |
| 4,323,394 | * 4/1982 | Hoffmuller et al. ......... | 416/241 B X |
| 4,417,854 | * 11/1983 | Cain et al. ....................... | 416/241 B |
| 4,494,287 | * 1/1985 | Cruzen et al. .................. | 29/156.8 R |
| 4,592,120 | * 6/1986 | Egan et al. ..................... | 29/156.8 R |
| 4,643,782 | 2/1987 | Harris et al. ......................... | 148/404 |
| 4,719,080 | 1/1988 | Duhl et al. ........................... | 420/443 |
| 4,790,723 | * 12/1988 | Wilson et al. ............... | 416/241 B X |
| 5,068,084 | 11/1991 | Cetel et al. .......................... | 420/443 |
| 5,403,153 | * 4/1995 | Goetze ............................. | 416/229 A |
| 5,514,482 | 5/1996 | Strangman ......................... | 428/623 |
| 6,059,533 | * 5/2000 | Stoker et al. .................... | 416/241 B |
| 6,132,175 | * 10/2000 | Cai et al. ..................... | 416/241 B X |

FOREIGN PATENT DOCUMENTS

| | | | |
|---|---|---|---|
| 694170 | * 7/1953 | (GB) ............................... | 416/241 B |
| 57-203803-A | * 12/1982 | (JP) ................................. | 416/241 B |
| 2-169803 | * 6/1990 | (JP) ................................. | 416/241 B |

* cited by examiner

Primary Examiner—John E. Ryznic
(74) Attorney, Agent, or Firm—F. Tyler Morrison

(57) ABSTRACT

According to the invention, an article that is exposed to high temperatures, e.g., over 1000° C. during operation is disclosed. In one embodiment, a turbine blade for a gas turbine engine includes a directionally solidified metallic substrate, e.g., a superalloy, which defines an airfoil, a root and a platform located between the blade and root. The platform has an underside adjacent the root, and a corrosion resistant ceramic overlay coating such as a stabilized zirconia is located on the underside of the platform and the neck. The applied coating prevents corrosion and stress corrosion cracking of blades in these regions.

17 Claims, 1 Drawing Sheet

ARTICLE HAVING CORROSION RESISTANT COATING

CROSS REFERENCE TO RELATED APPLICATIONS

Some of the subject matter disclosed herein is also disclosed in commonly owned pending applications Ser. Nos. 09/467,516 entitled "Article Having Corrosion Resistant Coating " by Allen, Olson, Shah and Cetel, 09/467,517 entitled "Article Having Corrosion Resistant Coating" by Allen and Olson, and 09/467,202 entitled "Methods of Providing Article With Corrosion Resistant Coating and Coated Article" and by Allen, Olson, Shah and Cetel, filed on even data herewith and expressly incorporated by reference herein.

BACKGROUND OF THE INVENTION

The present invention relates generally to coatings for corrosion protection, and more particularly to an article having such a coating.

Gas turbine engines are well developed mechanisms for converting chemical potential energy, in the form of fuel, to thermal energy and then to mechanical energy for use in propelling aircraft, generating electric power, pumping fluids etc. One of the primary approaches used to improve the efficiency of gas turbine engines is the use of higher operating temperatures. In the hottest portion of modern gas turbine engines (i.e., the primary gas flow path within the engine turbine section), turbine airfoil components, cast from nickel or cobalt based alloys, are exposed to gas temperatures above their melting points. These components survive only because cooling air is passed through a cavity within the component. The cooling air circulates through this cavity reducing component temperature and exits the component through holes in the component, where it then mixes with the hot gasses contained within the primary flow path. However, providing cooling air reduces engine efficiency.

Accordingly, there has been extensive development of coatings for gas turbine hardware. Historically, these coatings have been applied to improve oxidation or corrosion resistance of surfaces exposed to the turbine gas path. More recently, thermal barrier coating have been applied to internally cooled components exposed to the highest gas path temperatures so that the amount of cooling air required can be substantially reduced. Since coatings add weight to a part and debits fatigue life, application of the coating is intentionally limited to those portions of the component for which the coating is necessary to achieve the required durability. In the case of rotating parts such as turbine blades, the added weight of a coating adds significantly to blade pull, which in turn requires stronger and/or heavier disks, which in turn require stronger and/or heavier shafts, and so on. Thus there is added motivation to restrict use of coatings strictly to those portions of the blade, e.g., typically the primary gas path surfaces, where coatings are absolutely required.

With increasing gas path temperatures, turbine components or portions of components that are not directly exposed to the primary turbine gas path may also exposed to relatively high temperatures during service, and therefore may also require protective coatings. For example, portions of a turbine blade that are not exposed to the gas path (such as the underside of the platform, the blade neck, and attachment serration) can be exposed to temperatures in excess of 1200 F. during service. These blade locations are defined at 18 and 19 in FIG. 1. It is expected that the temperatures these portions of the blade are exposed to will continue to increase as turbine operating temperatures increase.

It is an object of the invention to provide a corrosion-resistant coating to prevent corrosion of components in regions not directly exposed to the hot gas stream.

It is another object of the invention to provide a corrosion-resistant coating to prevent stress corrosion cracking on portions of turbine blades which are not directly exposed to a hot gas stream.

It is yet another object of the invention to provide such a coating to protect against stress corrosion cracking of turbine blades in regions under the blade platform.

SUMMARY OF THE INVENTION

According to one aspect of the invention, improved durability of gas turbine blades is achieved through application of corrosion resistant coatings. A turbine blade for a gas turbine engine, typically consisting of a directionally solidified nickel-based superalloy, consists of an airfoil, a root and a platform located between the blade airfoil and root. The blade has a blade neck adjacent the blade root, and the platform has an underside adjacent the blade neck.

In one aspect of this invention, a corrosion resistant overlay coating such as a stabilized zirconia is applied to the underside of the platform and portions of the blade neck, preferably by plasma spray. The presence of this coating improves component life by preventing blade corrosion by the salt accumulating on regions of the blade shielded from direct exposure to the gas path, e.g., underplatform surfaces. An additional benefit of the applied coating is the prevention of blade stress corrosion cracking. The corrosion resistant overlay coating prevents corrosion and/or stress corrosion cracking by acting as a barrier between the salt and nickel-based alloy component.

In a more general application of the invention, the corrosion resistant overlay coating system may include an aluminide or platinum aluminide bond coat either between nickel alloy substrate and the MCrAlY layer or over the MCrAlY layer. The bond coat may be present to provide certain characteristics to the coated component. These characteristics may include more efficient blade repair/manufacture or improved durability.

DETAILED DESCRIPTION OF THE PREFERRED EMBODIMENTS

Figure 1:
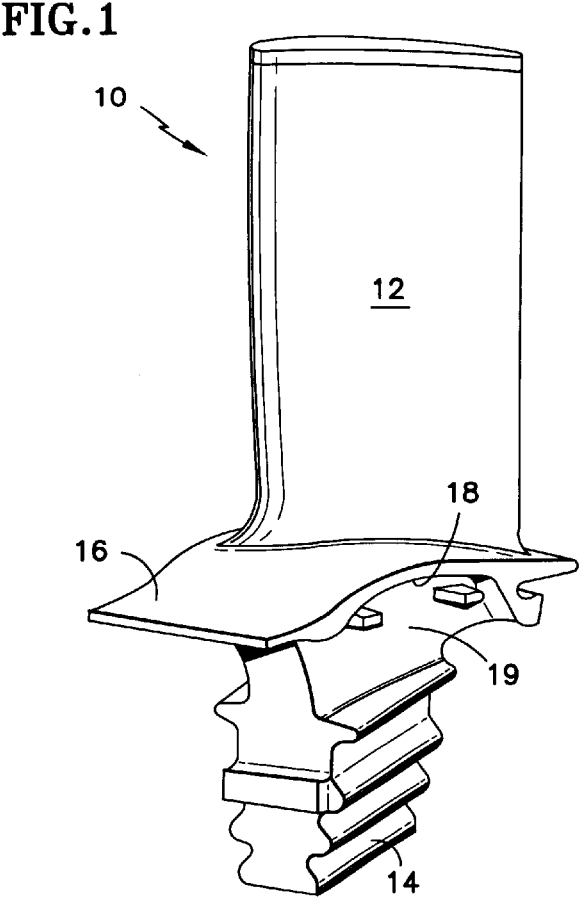
FIG. 1 is an illustration of a superalloy article in accordance with the present invention.

As illustrated in FIG. 1, a turbine blade composed of a superalloy material and incorporating the present invention is illustrated generally by the reference numeral 10. The turbine blade includes an airfoil 12, a serrated blade root 14 (used to attach the blade to the rotatable turbine disk) and a platform 16 located between the airfoil and serrated root. The region between the underside of the blade platform 18 and the root is referred to as the neck 19. Typically, turbine blades (and other gas turbine engine components) are composed of a directionally solidified nickel-based alloy, e.g., consisting of a single crystal or with multiple columnar grains oriented parallel to the direction of growth. Typical compositions of such alloys are shown in Table 1. Exemplary U.S. Patents describing columnar and single crystal and directionally solidified alloys include U.S. Pat. Nos. 4,209,348; 4,643,782; 4,719,080 and 5,068,084, each of which is expressly incorporated by reference herein. Cooling holes, which may be positioned on one or more portions of a turbine blade, may be provided for flowing cooling air over the specific portions of the airfoil during operation, as is known generally in the art.

a stabilized zirconia, e.g., 7YSZ, although the coating may also include other elements. We believe that other ceramic coatings may be employed with equal effect. See, e.g., commonly owned pending application Ser. Nos. 09/164,700, filed on Oct. 1, 1998, and continuing prosecution application Ser. No. 08/764,419, filed on May 22, 1998, both entitled "Thermal Barrier Coating Systems and Materials" and expressly incorporated by reference herein.

The coating is applied to the surface(s) to a thickness of at least about 0.25 mils and up to about 5 mils. For rotating

TABLE 1

COMPOSITION OF COLUMNAR AND SINGLE CRYSTAL ALLOYS

| Alloy | Type | Ni | Co | Cr | Al | Mo | Ta | W | Re | Hf | Ti | Nb |
|---|---|---|---|---|---|---|---|---|---|---|---|---|
| PWA 1422 | DS | Bal. | 10 | 9 | 5 | — | — | 12 | — | 1.6 | 2 | 1 |
| DS R80H | DS | Bal. | 9.5 | 14 | 3 | 4 | — | 4 | — | 0.75 | 4.8 | — |
| CM247LC | DS | Bal. | 9.2 | 8.1 | 5.6 | 0.5 | 3.2 | 9.5 | — | 1.4 | 0.7 | — |
| PWA 1480 | SC | Bal. | 5 | 10 | 5 | — | 12 | 4 | — | — | 1.5 | — |
| PWA 1484 | SC | Bal. | 10 | 5 | 5.65 | 1.9 | 8.7 | 5.9 | 3 | 0.1 | — | — |
| Rene' N5 | SC | Bal. | 7.5 | 7 | 6.2 | 1.5 | 6.5 | 5 | 3 | 0.15 | — | — |
| CMSX-4 | SC | Bal. | 9 | 6.5 | 5.6 | 0.6 | 6.5 | 6 | 3 | 0.1 | 1 | — |

It was discovered that the alkali and alkaline earth sulfate salts responsible for elevated temperature corrosion of turbine components (varying mixtures of sodium, potassium, calcium and magnesium sulfates) can accumulate on regions of the blade outside of the turbine gas path. These salts can be ingested with the inlet air in marine environments and/or form as a result of combustion processes. Corrosion attack of the blade by these salts is typically very limited at temperatures below the salt melting temperature (about 100 F.). With increased turbine operating temperature, however, blade regions shielded from the gas path can exceed the melting temperature of the sulfate salt resulting in accelerated corrosion of the blade neck and underside of the platform. It was also discovered that at sufficiently high stress levels, the presence of these salts may result in stress corrosion cracking of directionally solidified nickel-based turbine alloys having a single crystal or columnar grain structure. Stress corrosion cracking of these materials represents a newly discovered phenomenon.

In one aspect of the current invention, a corrosion-resistant overlay coating (21 in FIG. 1a) is applied to portions of the substrate 20, such as the underside of the platform 18 and the neck 19 of a turbine blade to prevent corrosion and/or stress corrosion cracking of the blade in these locations. While the present invention is illustrated in FIG. 1 as a turbine blade, the present invention is not limited to any particular component. Other components exposed to relatively high stress and corrosive conditions would also be expected to benefit from this invention.

Figure 1A:
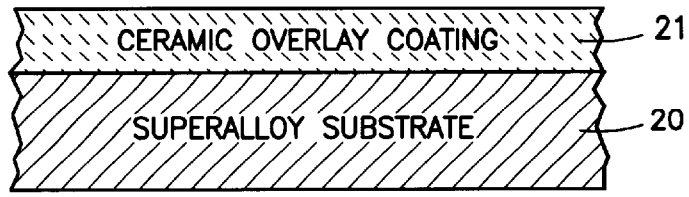
FIG. 1a is a schematic illustration of a coating applied to the article of FIG. 1.

Referring now to FIG. 1a, a corrosion inhibiting, ceramic coating is applied to a portion or portions of the article that are susceptible to corrosion and/or stress corrosion cracking. Using the turbine blade example, the coating is applied to the underside of the platform 18 and the neck 19 to prevent corrosion and/or stress corrosion cracking of the blade in these locations. While the present invention is illustrated in FIG. 1 as a turbine blade, the present invention is not intended to be limited to any particular component. Other components exposed to relatively high stress and corrosive conditions would also be expected to benefit from this invention. The overlay coating applied to the selected area (s), e.g., the under-platform surface 18 and neck 19 may be a conventional thermal barrier coating type material, such as applications, such as turbine blades, the coating thickness should be adequate to ensure complete coverage of the area to be coated, e.g., no uncoated areas in the portions to be covered, and provide corrosion life necessary for providing protection for a typical blade service interval. The maximum coating thickness should be limited due to the fatigue debit associated with the additional weight of coatings, which typically add weight but not structural strength to the article. Accordingly, the thickness for rotating components is preferably less than about 3 mils, and more preferably about 2 mils.

The coating may be applied by various processes, such as by vapor deposition or thermal spray. We prefer to use a plasma spray, which has been used previously to apply ceramic materials to other portions of gas turbine engine components such as the airfoil portions.

Figure 2:
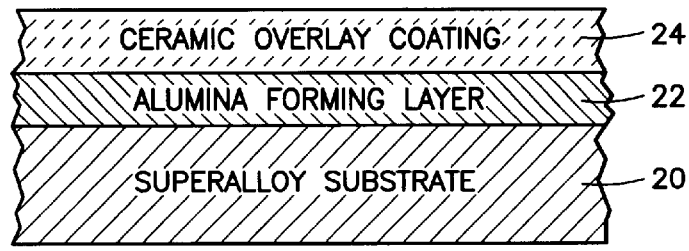
FIG. 2 is a schematic illustration another embodiment of the present invention.

FIG. 2 is an alternate embodiment of the present invention. Tile component includes an alumna forming coating between the ceramic layer and the substrate. For example, the component may include a substrate 20 as above, an alumina forming layer 22 such as an MCrAl type overlay coating or an aluminide layer. Both MCrAl coatings, which may include other elements such as Y, Hf, Si, Re and others, and aluminide coatings are known generally, and the particular MCrAl and aluminide compositions and methods of application need not be described here in detail. See, e.g., commonly owned U.S. Pat. No. Re 32,121 for a discussion of MCrAlY coatings and U.S. Pat. No. 5,514,482 for a description of aluminide coatings, both of which are expressly incorporated by reference herein. As is the case with the ceramic coating, the alumina forming layer adds weight but not structural strength to the article being coated, and should be no thicker than necessary. The ceramic, such as 7YSZ may then be applied by any suitable process, such as thermal spray or physical vapor deposition.

The present invention provides significant improvement over the prior art. Applying a ceramic coating on selected portions of an article which are subjected to high temperatures and stresses, such as the under-platform surfaces of a turbine blade, provides superior corrosion and stress corrosion protection during operation. Moreover, there already exists significant experience in applying ceramic materials to other portions of these components, as well as to other components.

While the present invention has been described above in some detail, numerous variations and substitutions may be made without departing from the spirit of the invention or the scope of the following claims. Accordingly, it is to be understood that the invention has been described by way of illustration and not by limitation.

What is claimed is:

1. A turbine blade for a gas turbine engine comprising a superalloy substrate defining an airfoil, a root and a platform located between the blade and root, the platform has an underside adjacent the root, and a corrosion inhibiting, ceramic overlay coating on the underside of the platform.

2. The turbine blade of claim 1, wherein the overlay coating is also applied to the blade neck.

3. The turbine blade of claim 1, wherein the ceramic coating is composed of stabilized zirconia.

4. The turbine blade of claim 1, wherein the substrate is composed of a directionally solidified nickel base superalloy.

5. The turbine blade of claim 1, wherein the substrate is composed of a single crystal nickel base superalloy.

6. The turbine blade of claim 1, wherein the ceramic coating has a nominal thickness of less than about 5 mils.

7. The turbine blade of claim 1, wherein the coating has a thickness between about 0.25–3 mils.

8. The turbine blade of claim 1, further comprising:
   an alumina layer on the substrate surface, the ceramic coating on the alumina layer.

9. The turbine blade of claim 1, wherein the alumina layer is formed from an aluminide or overlay bond coat.

10. In a superalloy gas turbine component which operates in an environment with gas temperatures in excess of 1,000° C., the component having a first, exposed portion which is directly exposed to hot gasses, a second, shielded section which is shielded form direct exposure to the gasses, and a third section between the airfoil and root and having an underside surface adjacent the root, the improvement which comprises a corrosion inhibiting ceramic coating applied to the third section.

11. The component of claim 10 comprising a turbine blade, the first portion forming an airfoil, the section portion forming a root, and the third section forming a platform, the improvement comprising a ceramic coating applied to the underside of the platform.

12. The component of claim 10, wherein the components is composed of a directionally solidified superalloy material.

13. The component of claim 10, wherein the ceramic coating is composed of a stabilized zirconia.

14. The component of claim 10, wherein the coating has a thickness between about 0.25–3 mils.

15. The component of claim 10, further comprising:
   a alumina layer on the substrate surface, the ceramic coating on the alumina layer.

16. The turbine blade of claim 1, wherein at least a portion of the airfoil is coated by a coating having a composition different from the underplatform surface.

17. The turbine blade of claim 1, wherein at least a portion of the airfoil is coated by metallic coating and the underplatform surface is coated with a ceramic coating.

* * * * *